Dec. 28, 1965   E. F. STEPHENSON ET AL   3,225,603
FLUID DENSITY MEASURING APPARATUS

Filed May 14, 1962   4 Sheets-Sheet 1

INVENTORS
E. F. Stephenson
L. W. Stagg
BY
*Holcomb, Wetherill & ...*
ATTORNEY

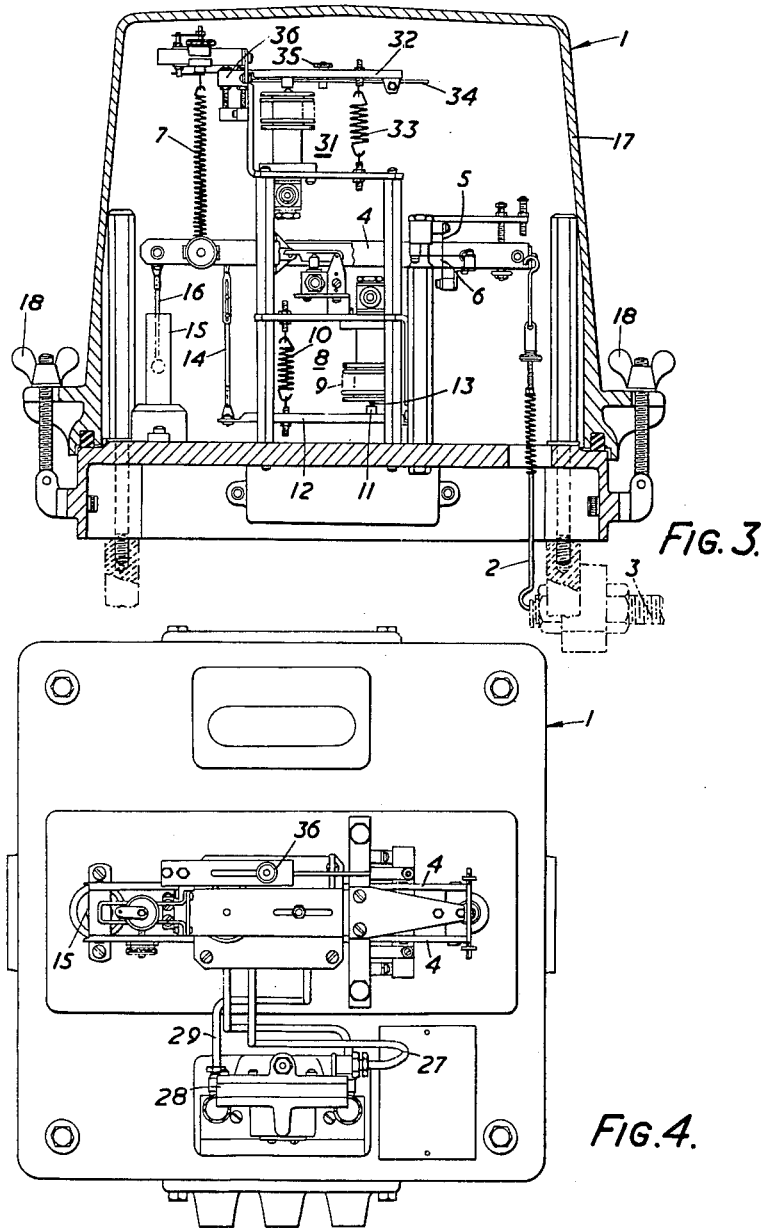

Dec. 28, 1965   E. F. STEPHENSON ET AL   3,225,603
FLUID DENSITY MEASURING APPARATUS
Filed May 14, 1962   4 Sheets-Sheet 4

INVENTORS
E. F. STEPHENSON
BY L. W. STAGG

Holcombe, Wetherill & Brisebois
ATTORNEYS

United States Patent Office 3,225,603
Patented Dec. 28, 1965

3,225,603
FLUID DENSITY MEASURING APPARATUS
Eric Fletcher Stephenson, Wallington, and Leslie William Stagg, Warlingham, England, assignors to Rotameter Manufacturing Company Limited, Croydon, Surrey, England
Filed May 14, 1962, Ser. No. 194,598
3 Claims. (Cl. 73—434)

This invention relates to fluid density measuring apparatus of the kind which provides a continuous indication of the density of a moving fluid.

The specification of British Patent No. 776,926 describes apparatus of the kind referred to and comprising an elongated horizontally mounted U tube the open ends of which constitute an inlet and outlet respectively for the fluid, the ends being flexibly connected to the fluid source. The tube is pivoted about a horizontal axis transverse to the length of the tube adjacent the open ends and a link attached to the tube about midway of its length is connected to one arm of a weighing beam the other arm of the beam being connected to a recording instrument which indicates any variation in weight of the U tube when fluid is flowing through it.

In setting up the apparatus described the first operation is to counterpoise the tube while it is full of water of known density.

The water is then drained out and weights are added to a scale pan on the weighing beam until the equilibrium is restored. The weight so added is a constant of the particular apparatus and can be used to calculate the weight which would be required to balance the tube when full of liquid of any desired density, and the weight change which corresponds to any desired density change. Calibration of the apparatus thus consists of adjusting the balance weight to suit the required minimum density, and adjusting the sensitivity of the force-measuring device to suit the desired density range.

While the density meter described can be used for measuring the density of clean fluids as well as the density of a slurry, it is desirable to have available apparatus of greater sensitivity than that described in the specification referred to and one object of the present invention is to provide for such increased sensitivity in order to increase the range of application of the apparatus.

Again, a simple measurement of the density of a fluid provides no information as to its composition unless the temperature of the fluid is known. It is not usually convenient to control the temperature of a fluid being passed through the density meter and as obviously density will vary with temperature, a method of compensating for temperature changes is clearly desirable. A further object of the invention therefore is to provide for such compensation.

According to the present invention fluid density measuring apparatus comprises an elongated hollow member pivotally supported at one end for rocking about a horizontal axis and defining a flow channel extending continuously from an inlet to an outlet positioned respectively at said one end, and flexible connecting means for connecting the inlet and outlet to a supply of the fluid whereby the fluid is caused to circulate continuously through the channel, and adapted to permit deflection of the hollow member in accordance with variations in the density of the fluid, the apparatus including a lever member operatively connected to the said hollow member for deflection in accordance with deflection of said hollow member, resilient biasing means arranged to exert a force opposing downward deflection of the hollow member, and a follow-up servo system operatively connected to the said lever member and arranged to give an output signal which is representative of the deflection of the lever member.

The follow-up servo system may include a second lever member pivotally mounted on one arm of the first-mentioned lever member, and means for performing a follow-up servo function in accordance with the deflection of the second lever member.

The means for performing the said follow-up servo function may include a resiliently biased pneumatic actuating device, arranged under the control of a pneumatic detecting device mounted for cooperation with the said second lever member, to deflect the latter so as to restore balanced conditions in the follow-up servo system when the said conditions are disturbed by variation of the density of the fluid.

The output signal from the follow-up servo system may be derived from the pneumatic control device as a pneumatic pressure representing the density of the fluid.

The said hollow member may be connected to the first-mentioned lever member through a pivotally mounted third lever member on one side of the latter's pivot, the other side being provided with an adjustable counter poise, whereby the deflection of the said hollow member can be reduced to zero for the condition in which it carries the fluid of the lowest density required to be measured.

The resilient biasing means may be adjustable for varying the sensitivity of the apparatus.

Fluid density measuring apparatus may also include output means arranged to give the signal related to the density of the fluid and compensating means positioned in the main stream of the fluid responsive to the temperature of the fluid arranged continuously to vary the signal in accordance with the said temperature in such a manner as to reduce or eliminate the effect of the fluid temperature variations on the output signal from the apparatus. The compensating means may be a resilient biased pneumatic actuating device, and the means responsive to the temperature of the fluid may be arranged to control movement of the actuating device the latter being arranged to vary the reference value of the density measurement in accordance with the temperature of the fluid.

Advantageously the said resilient biasing means includes an auxiliary resilient element arranged to be distorted under the predetermined range of the temperature of the fluid in such a manner that deflection of the said lever member is a non-linear function of fluid temperature approximating more closely to a predetermined density-temperature characteristic of a fluid.

Alternate forms of devices embodying the invention will now be described in greater detail by way of example with reference to the accompanying drawings in which:

FIGURE 3 is an elevation in section of an alternative form of transmitter,

FIGURE 4 is a plan view of the transmitter shown in FIGURE 3,

Figure 1:
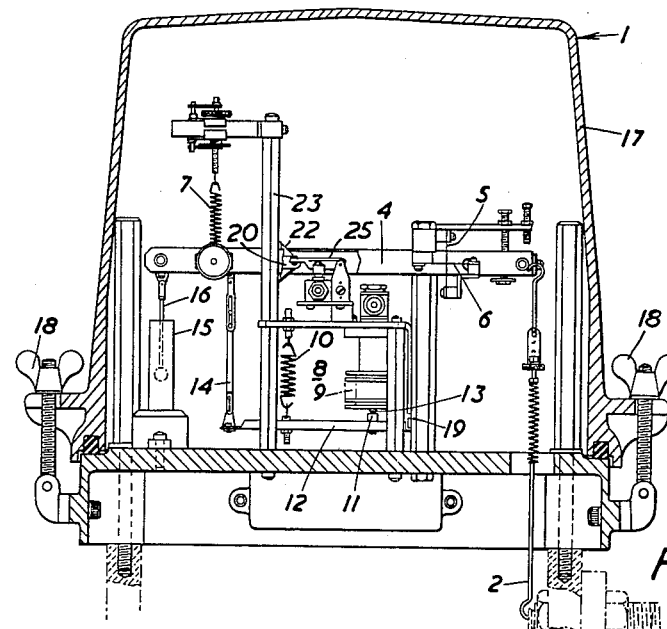
FIGURE 1 is an elevation in section of one form of transmitter.
Figure 2:
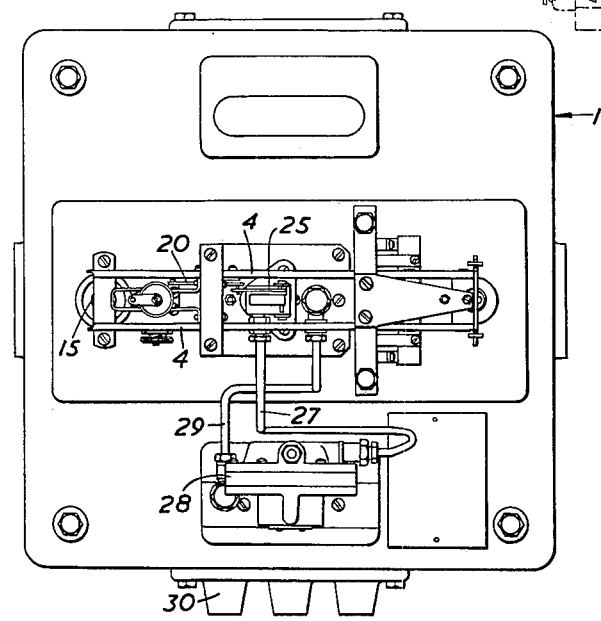
FIGURE 2 is a plan view of the transmitter shown in FIGURE 1.

Referring to FIGURES 1 and 2 of the drawings, the transmitter, generally indicated at 1, is mounted above a U tube assembly, not shown but in major respects similar to that shown in the drawing attached to British patent specification No. 776,926. Instead of applying the force-balance device directly to an extension of the weighing beam as described in that specification, there is provided a connecting link 2 attached to the rear end of the balance beam 3. The major part of the weight of the U tube and its contents is supported by balance weights on the balance beam, but a small force representing the density change which the apparatus is required to measure is produced in link 2 by the action of the transmitting mechanism. Although a spring is shown as forming part of the link 2 and serves to provide protection against severe overload, the provision of such a spring is not essential and it is important that the link should be effectively rigid to transmit motion of the balance beam.

The upper end of link 2 is attached to one end of a lever 4 mounted on flexure pivots 5 and 6. It follows that small changes in the weight of the liquid in the U tube may be counterpoised by applying suitable forces to the other end of the lever 4. This may be done in two ways.

(1) The lever may be maintained in a horizontal position through the agency of a sensing device which controls the magnitude of an electric current or a pneumatic pressure which may be fed respectively to an electro-magnetic device or a pneumatic cylinder or bellows. The electro-magnetic device or the pneumatic cylinder or bellows may be arranged to produce a force on the left hand end of the lever 4 and the sensing device will ensure that this force is always sufficient to maintain the lever in a horizontal position. It follows that the magnitude of this force will be such as to counterpoise the force in the link 2 and will, therefore, be a measure of the density change which gave rise to the force in link 2. Indication of density changes may, therefore, be given by means of a current indicator connected in series with an electromagnetic device or by a pressure gauge connected to the pneumatic cylinder or bellows.

(2) The left hand end of the lever 4 is supported by a measuring spring 7. When the force in link 2 changes, the lever 4 will move until the change in force has been counterpoised by a change in the tension of the spring 7. Thus the angular position of the lever 4 will depend on the force in the link 2 and if a pointer were attached to the lever 4 it could be used to indicate density changes on a suitable scale attached to the frame.

It is method 2 which is used in the arrangement illustrated in FIGURE 1. The apparatus has two distinct functions. In the first place there is the lever 4 and the spring 7 which constitute a density measuring device in which the angular position of the lever 4 is a measure of density changes. The lever 4 is composed of two parallel limbs as shown. Since this is an oscillatory system it is necessary to provide some damping for which purpose a dashpot 15 is provided the piston of which is connected by a link 16 to one end of the lever 4.

Figure 5:
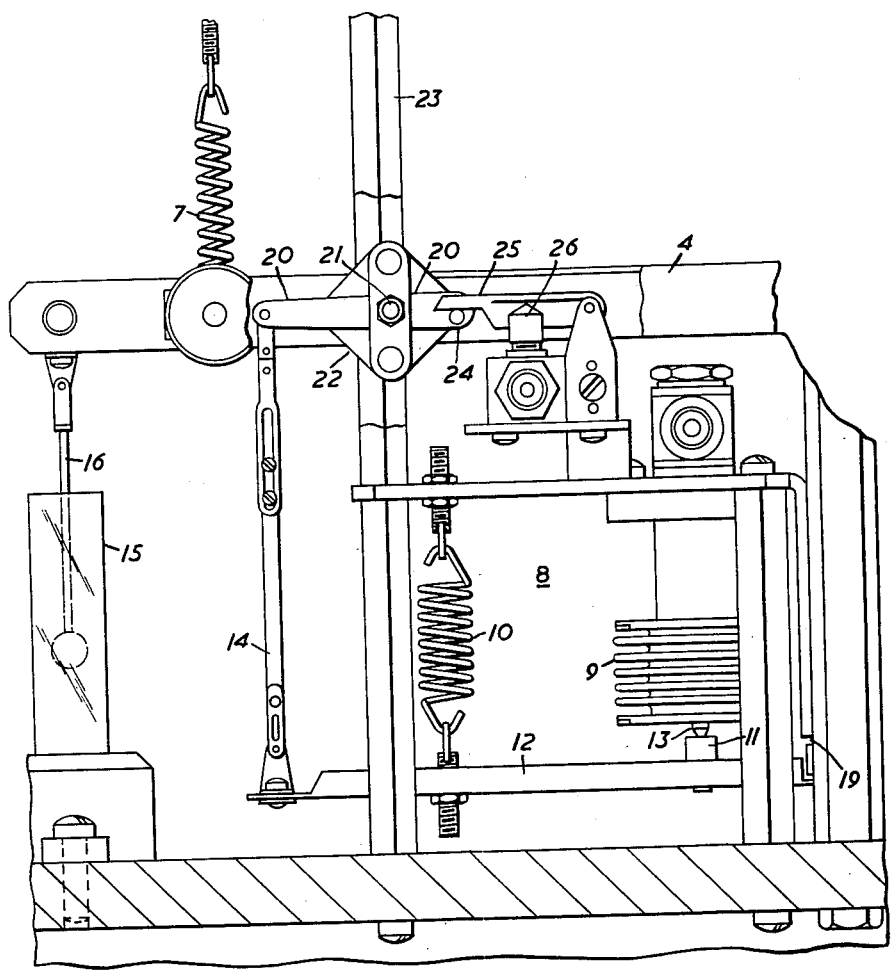
FIGURE 5 is a view on an enlarged scale of a detail which is common to the other figures, and, FIGURE 6 is a schematic diagram partly in perspective illustrating the inter-relation of the component parts of a specific gravity apparatus.

The rest of the apparatus is concerned with translating angular movements of the lever 4 into a pneumatic pressure. For this purpose there is provided a servo device 8 in which a rigid frame carries a bellows 9 and a lever 12 attached to the frame by a flexure spring 19 (see FIG. 5). The free end of the bellows carries a hardened point 13 which engages in a cup 11 mounted on the lever 12. A spring 10 is anchored at one end to the frame and attached at the other end to the lever 12. Accordingly, as the pressure varies in the bellows 9, the lever 12 will assume a position in which the thrust of the bellows is counterpoised by the tension in the spring, and consequently the angular position of the lever 12 will be a measure of the pressure in the bellows.

The free end of lever 12 is connected by a link 14 to another lever 20 pivotally mounted at 21 in a bearing plate 22 on lever 4. The mounting of the lever 20 and its associated components is shown more clearly in FIGURE 5 in which part of post 23 (FIGURE 1) and part of one of the links of the lever 4 are shown removed.

The other end of lever 20 carries a pin 24 which engages a lever and flapper 25 pivotally mounted on the frame. The flapper 25 co-operates with a nozzle 26 in a manner well known in the art to produce changes in the pressure of air supplied to the nozzle. These pressure changes are communicated by pipe 27 to a relay 28 where they are amplified and then fed via pipe 29 to the bellows 9. The flapper-nozzle combination constitutes a sensing device which controls the pressure in the bellows in such a way that whatever position is taken up by the lever 4, the pin 24 will be substantially stationary relative to the frame. It follows that if the lever 4 moves up (for instance) the link 14 will be obliged to move up by an amount sufficient to bring the pin 24 back to its original position, and there will be a pressure change in the bellows 9 representing on some chosen scale the density change which produced the movement of lever 4 and which is indicated by a pressure gauge, connected with the bellows at a coupling point 30.

A cover 17 for the transmitter mechanism is releasably secured by wing nut clamps 18. The transmitter shown in FIGURES 3 and 4 of the drawings enables temperature compensation to be effected.

The effect on density of temperature variations in the liquid is effectively to shift the zero point of the density scale without appreciably altering its span. It follows that all that is necessary in order to compensate for temperature errors is to raise or lower the fixed attachment of the spring 7.

In the arrangement shown in FIGURES 3 and 4 there is mounted above the mechanism already described, a pneumatic unit 31 similar in construction to the unit 8 already described. In order to effect temperature compensation the bellows of the unit 31 is supplied with a pneumatic signal derived from a temperature responsive transmitter immersed in the liquid under measurement. The upper end of the measuring spring 7 being attached to an extension of a lever 32 moves up and down in proportion to changes of temperature to an extent which may be adjusted by altering the radius of action of a spring 33 until it suffices to compensate the corresponding density errors. For many liquids and particularly aqueous solutions, the density/temperature relationship is non-linear. In such cases an auxiliary cantilever spring 34 may be brought into action at some point in the travel of the lever 32 so that the lever may be given two rates of movement by the suitable choice of which a close approximation may be made to the required curvilinear rate. The cantilever rate is adjustable by means of the sliding clamp 35 and its point of entry is adjustable by raising or lowering the block 36 upon which it is mounted.

Alternatively to the use of the method described above, if the force balance system is used as first described in outline, temperature compensation may be effected by adding to the pneumatic or electric signal derived from the density transmitter, another signal derived from a temperature responsive pneumatic or electric device.

Figure 6:
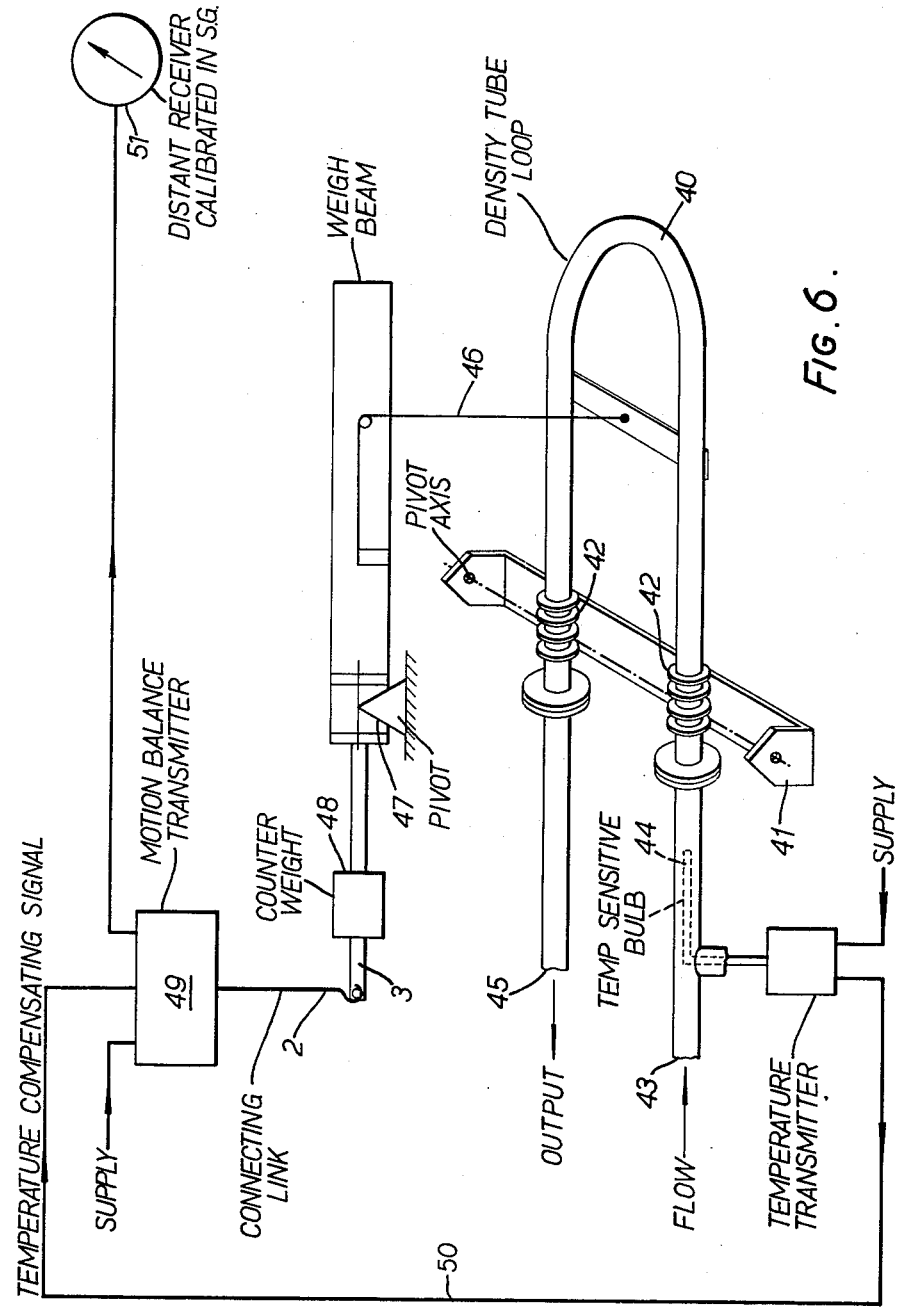

FIGURE 6 illustrates schematically the configuration of the various component parts of the specific gravity measuring apparatus referred to. The U-tube 40 is pivotally supported at 41 about a horizontal axis which passes through the flexible conecting links 42. Fluid flows from the inlet 43 over the temperature sensitive bulb 44 in the fixed part of the inlet arm of the U-tube 40 and out again at the outlet 45. Motion of the U-tube is transmitted by link 46 to the main beam 3 pivotally supported at 47 and counterpoised by counter weight 48. This motion is transmitted by the link 2 to the motion-balance transmitter generally indicated at 49. Temperature compensating signals from the temperature sensitive bulb 44 are passed via line 50 to the motion-balance transmitter 49. Output measuring signals are produced from the transmitter 49 in the manner already described and are displayed on a gauge 51 calibrated to read directly in units of specific gravity.

We claim:
1. Fluid density measuring apparatus comprising an elongated hollow member pivotally supported at one end for rocking about a horizontal axis and defining a flow channel extending continuously from an inlet to an outlet positioned respectively at said one end, and flexible connecting means for connecting the inlet and outlet to a supply of the fluid whereby the fluid is caused to circulate continuously through the channel, said apparatus including output means arranged to give a signal related to the density of the fluid and compensating means positioned in the main stream of the fluid, responsive to the temperature of the fluid, arranged continuously to vary the signal in accordance with the said temperature in such a manner as to reduce or eliminate the effect of the fluid temperature variations on the output signal from the apparatus, said compensating means comprising a resiliently biased pneumatic actuating device, and means responsive to the temperature of the fluid arranged to control movement of the actuating device, the latter being arranged to vary a reference value of the density measurement in accordance with the temperature of the fluid.

2. Fluid density measuring apparatus comprising an elongated hollow member pivotally supported at one end for rocking about a horizontal axis and defining a flow channel extending continuously from an inlet to an outlet positioned respectively at said one end, and flexible connecting means for connecting the inlet and outlet to a supply of the fluid whereby the fluid is caused to circulate continuously through the channel, said flexible connecting means being adapted to permit deflection of the hollow member in accordance with variations in the density of the fluid, the apparatus including a lever member operatively connected to the said hollow member for deflection in accordance with deflection of the latter, resilient biasing means arranged to exert a force opposing downward deflection of the hollow member, and a follow-up servo system operatively connected to the said lever member and arranged to give an output signal which is representative of the deflection of the lever member, the said resilient biasing means arranged to exert a force opposing downward deflection being continuously variable in accordance with the temperature of the fluid, said resilient biasing means comprising a resilient member and including a resiliently biased pneumatic actuating device, and means responsive to the temperature of the fluid arranged to control movement of the actuating device, the latter being arranged to vary the amount of pre-stressing of the said resilient member and thereby to vary a reference value of the density measurement in accordance with the temperature of the fluid.

3. Apparatus according to claim 2 wherein the said resilient biasing means include an auxiliary resilient element arranged to be distorted over a predetermined range of the temperature of the fluid in such a manner that deflection of the said lever member is a non-linear function of fluid temperature approximating more closely to a predetermined density-temperature characteristic of a fluid.

References Cited by the Examiner
UNITED STATES PATENTS

| | | | |
|---|---|---|---|
| 2,321,175 | 6/1943 | Binckley | 73—434 |
| 3,039,310 | 6/1962 | Copland et al. | 73—434 |
| 3,044,302 | 7/1962 | Knauth | 73—434 |

FOREIGN PATENTS

| | | |
|---|---|---|
| 776,926 | 6/1957 | Great Britain. |
| 870,733 | 6/1961 | Great Britain. |

RICHARD C. QUEISSER, *Primary Examiner.*

DAVID SCHONBERG, J. FISHER, *Examiners.*